May 18, 1954     H. J. WHITE     2,678,700
ELECTRODE SYSTEM FOR ELECTRICAL PRECIPITATORS
Filed Oct. 29, 1952     3 Sheets-Sheet 1

INVENTOR.
HARRY J. WHITE
BY Harold T. Stowell
ATTORNEY

May 18, 1954 H. J. WHITE 2,678,700
ELECTRODE SYSTEM FOR ELECTRICAL PRECIPITATORS
Filed Oct. 29, 1952 3 Sheets-Sheet 2

INVENTOR.
HARRY J. WHITE
BY Harold T. Stowell

ATTORNEY

May 18, 1954     H. J. WHITE     2,678,700
ELECTRODE SYSTEM FOR ELECTRICAL PRECIPITATORS
Filed Oct. 29, 1952     3 Sheets-Sheet 3
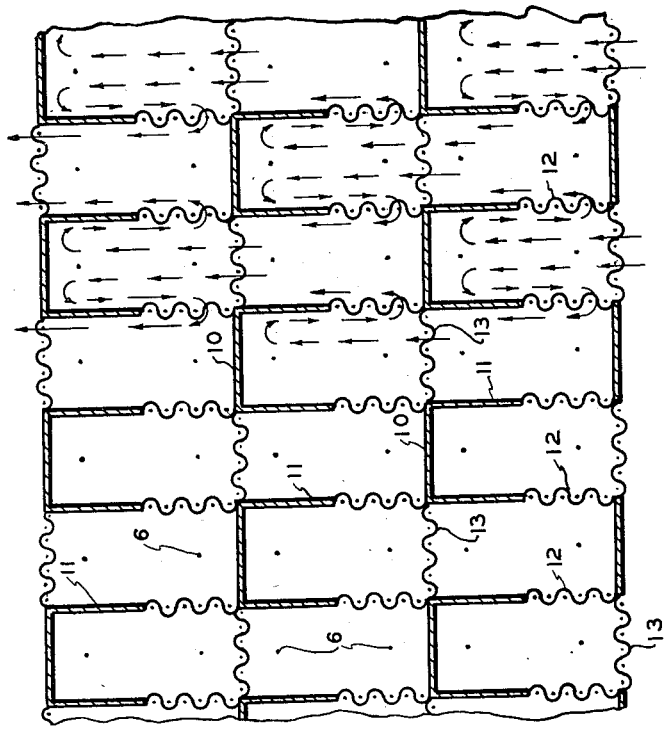
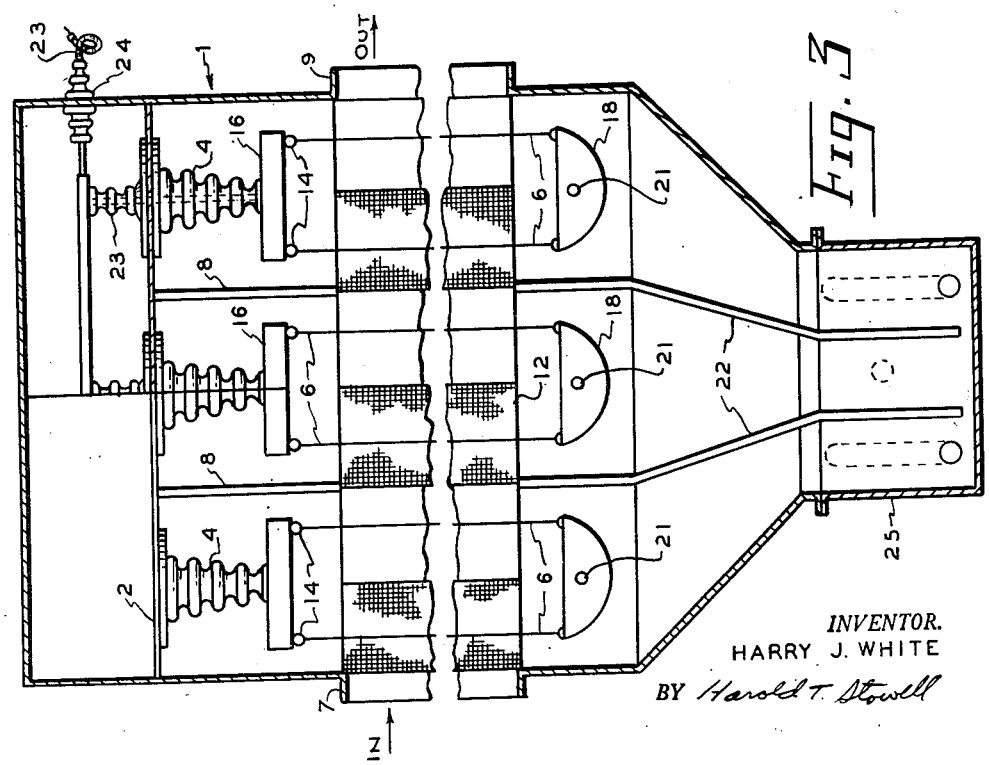
INVENTOR.
HARRY J. WHITE
BY Harold T. Stowell
ATTORNEY Patented May 18, 1954

2,678,700

UNITED STATES PATENT OFFICE 2,678,700

ELECTRODE SYSTEM FOR ELECTRICAL PRECIPITATORS

Harry J. White, Bound Brook, N. J., assignor to Research Corporation, New York, N. Y., a corporation of New York Application October 29, 1952, Serial No. 317,530

10 Claims. (Cl. 183—7)

This invention relates to electrical precipitators for the removal of suspended particles from gases, and has for its primary object the provision of a precipitator of simple and relatively inexpensive construction which provides an exceedingly tortuous path having numerous reversals of direction for the gas being treated whereby the electrical precipitating action is rendered more effective.

Prior electrical precipitator practice has usually sought to provide at least a major unobstructed flow path through the precipitator whereby the pressure or draft loss through the precipitator is kept to a minimum. However, in many practical installations, a moderate draft loss, in the order of 3 to 4 inches water gage is not seriously objectionable, and where this is the case I have found that the efficiency of precipitation may be very materially improved by the use of a novel type of mechanical baffling which provides maximum effectiveness in removing particles together with only a moderate amount of draft loss, in a very simple and inexpensive construction.

These objects of the invention are accomplished by providing a series of chambers in the precipitator portion of a gas duct, the chambers having portions which form pockets for effectively reversing the direction of flow and also retarding gas velocity to such an extent as materially to reduce erosion and rapping loss and facilitate sufficient removal of the collected material from the precipitation zones. In addition to the above pocket portion, each chamber also has a perforate wall portion disposed downstream of the gas flow with respect to the pocket portion, adjacent chambers being so arranged that the perforate portion which constitutes the outlet of one chamber also serves as the inlet to an adjacent chamber. The chamber walls serve as collector electrodes, suitable discharge electrodes being provided within the chambers spaced from said walls to provide an electrostatic precipitation zone.

The specific nature of the invention, as well as other objects and advantages thereof, will clearly appear from the description of preferred embodiments as shown in the accompanying drawings in which:

Fig. 3 is a sectional side view taken on line 3—3 of Fig. 2;

Fig. 4 is a sectional view taken on line 4—4 of Fig. 1, showing the arrangement of treatment cells of chambers according to the invention.

Figure 1:
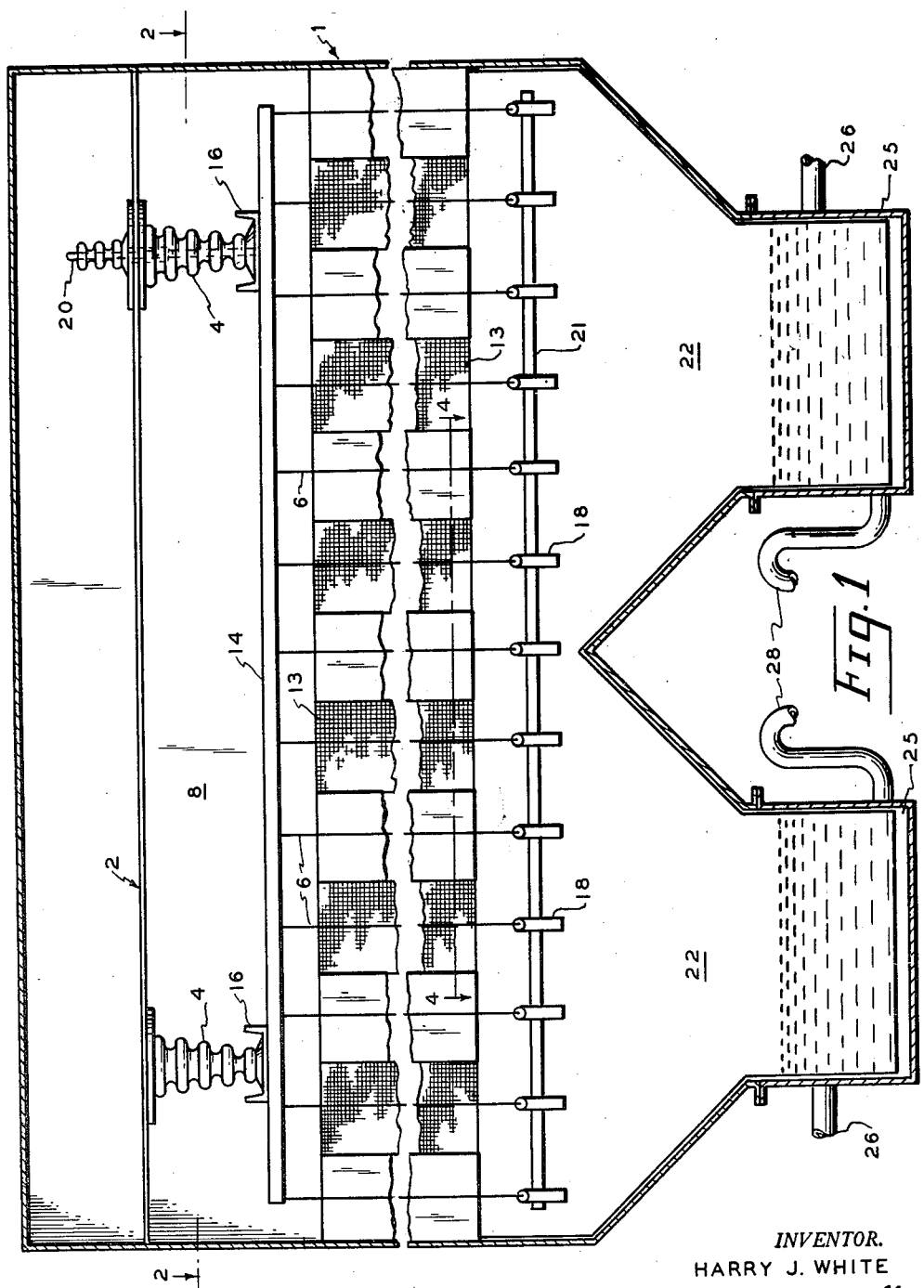
Fig. 1 is a transverse sectional view across a precipitator duct zone according to the invention, taken on line 1—1 of Fig. 2.
Figure 2:
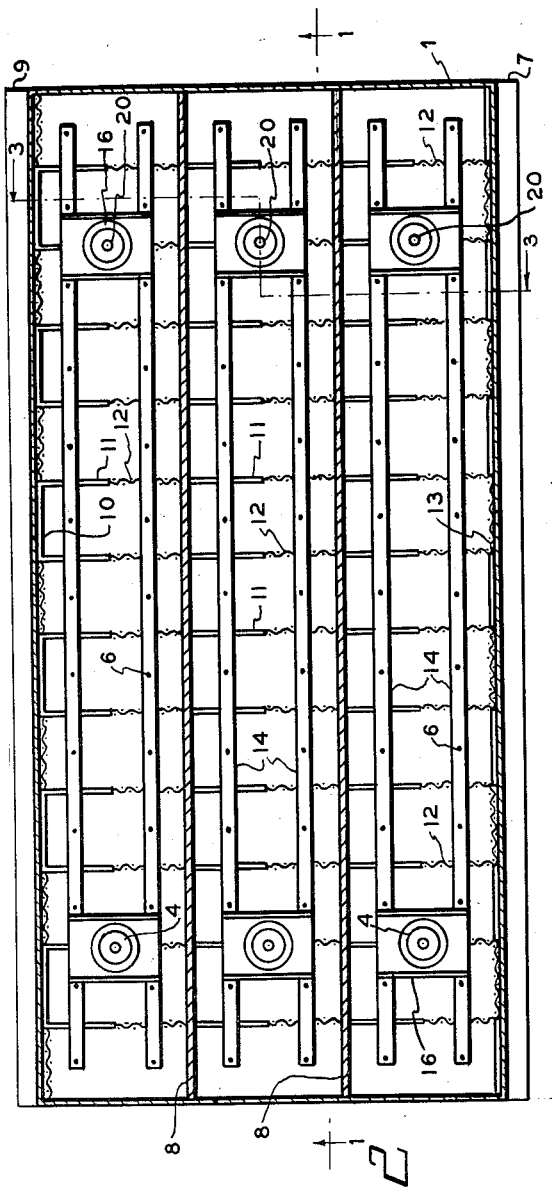
Fig. 2 is a sectional plan view taken on line 2—2 of Fig. 1.

The precipitator is housed in a shell or casing 1, having a top enclosure 2 which serves both as a gas-tight ceiling for the precipitator and also serves to support a plurality of insulators 4 which both conduct current to and also mechanically support discharge electrodes 6 of the precipitator. Partition 2 also serves to support vertically disposed baffles 8 which serve to prevent gas sneakage above the three treating areas which will be described below. An inlet 7 and an outlet 9 are shown in Fig. 3 for indicating the points of connection of the precipitator to a suitable gas duct (not shown), the direction of flow being indicated by arrows in Figs. 3, 4 and 5. The precipitation zone is divided into a plurality of chambers having vertical walls as best shown in Fig. 4. Portions of these walls are perforated as indicated at 12 and 13, while other portions are solid or imperforate as indicated at 10 and 11. Since the chamber walls constituted by sections 10, 11, 12, and 13 all form part of the collector electrode system, and therefore may be at the same potential as the outer wall or casing 1, they may be suitably mechanically fastened to the wall in any desired manner, as no insulation problem exists.

Discharge electrodes 6 are suspended from conducting horizontal rod member 14 which are in turn supported by transverse high tension members 16. High tension rods 20 passing through the center of insulators 4 conduct power from leads or cables 23 through insulating bushings 24 to the discharge electrode assembly. The conducting members 20 are, of course, omitted from the insulators at the far end of rod members 9, where only mechanical support and insulation are required. At the lower end of the discharge electrodes suitable weights 18 are provided which are further held at a predetermined spacing by spacing and steadying bars 21.

It will be noted that the transverse walls constituted by elements 13 and 10 of the treatment chambers (see Fig. 4) divide the treatment chamber into a number of transverse zones shown as 3 in the figures, although it will be apparent that any suitable number of zones may be employed. Baffles 8 are provided above the treatment area extending from the upper portions of the intermediate walls formed by elements 10 and 13 to the top member 2. Similar baffles 22 extend below the treatment chambers substantially in alignment with baffles 8 and serve to prevent gas sneakage below the treatment area. Sealing pots 25 are provided at the bottom of the precipitator and are kept full of water by means of inlet pipes 26 fed with water at a suitable pressure and goose-necked discharge pipes 28 which serve to maintain the level of water in sealing pots 25. Baffles 22 are brought down to a point below the liquid in pots 25 to maintain a good seal at this point. It will be noted that the customary rapping means for periodically dislodging collected material from the collector electrodes, together with specific means for carrying away the dislodged material are not shown, as such means are conventional and do not constitute any part of the present invention, although it may be noted that the dislodged material could be carried away or flushed away with the water in sealing pots 25 if desired.

Figure 5:
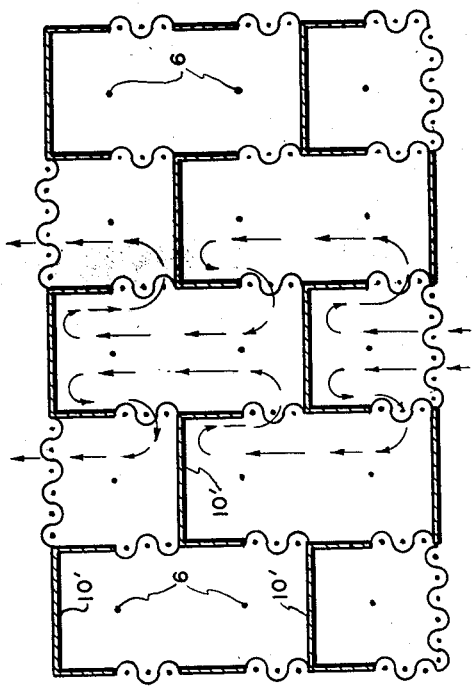
Fig. 5 is a view similar to Fig. 4 showing a modified arrangement of the precipitation cells.

Fig. 5 shows another chamber arrangement for providing a tortuous path of gas flow, as will be apparent from inspection of the figure. In this figure, the end walls 10' of each chamber are all imperforate, and each side wall has two perforate areas, one comprising an inlet and one an outlet, the chambers being staggered as shown. Thus, although all the chambers are identical, substantially the same tortuous gas flow path is provided as with the construction of Fig. 4.

Although the gas-permeable portions of the chamber walls are described by the use of the word "perforate," it is intended that this word shall be given a broad interpretation so as to include not only a solid sheet containing perforations, but also the use of screen material of woven mesh construction; fibrous filtering material such as glass wool, or any other mechanical construction which will be gas permeable but will also serve to retard the flow of gas therethrough.

It will be apparent that various other modifications of the chamber arrangement are possible which will still provide the major advantages of the invention, as the embodiments shown are only exemplary and various modifications can be made in construction and arrangement within the scope of the invention as defined in the appended claims.

I claim:

1. In an electrical precipitator, a casing defining a gas-conducting duct having an inlet and an outlet, partitions dividing said duct into a series of chambers, the walls of said chambers comprising the collecting electrodes of a precipitator system, discharge electrodes in at least some of said chambers spaced from said walls, the walls of said chambers comprising solid, imperforate sections and perforated sections, the perforated sections being so staggered with respect to each other as to force the gas entering the inlet to follow a tortuous path through a series of said chambers to reach the outlet.

2. The invention recited in claim 1, the walls of certain of said chambers being perforated at the end of each said chamber toward the duct inlet, and at least part of one side toward said inlet end, the imperforate wall portions of said chamber forming a pocket in which gas flowing from said first perforated wall portion toward second said perforated wall portion tends to reverse direction in said pocket, certain of said discharge electrodes being disposed in said region of gas direction reversal.

3. In an electrical precipitator, a gas flow chamber constituting a collector electrode and having side walls and end walls, one of said end walls being downstream of the gas flow direction, said last wall being perforated to retard the flow of gas therethrough, the other end wall being unperforated, at least one of said side walls being perforated in the portion thereof toward said perforated end wall to form a gas outlet, and imperforate in the portion toward the other end wall, the remaining side wall being also imperforate in the portion thereof toward said other end wall, so that said imperforate portions form a gas pocket, at least one discharge electrode in said chamber spaced from the walls thereof, and means for producing a precipitating electrical discharge between said electrodes.

4. The invention recited in claim 3, and a second gas flow chamber adjacent said first chamber, the partially perforated side wall of said first chamber being common to both chambers whereby the said outlet wall of the first chamber constitutes an inlet wall of said second chamber, said second chamber having a side wall opposite said inlet wall and two end walls, one being generaly downstream and the other generally upstream of gas flow, said downstream wall being imperforate and said upstream wall being perforated to constitute a gas outlet, said walls constituting a collector electrode, and at least one discharge electrode in said second chamber spaced from said walls thereof.

5. The invention recited in claim 4, and a second pair of chambers corresponding to said first pair and arranged generally downstream thereof, the perforated outlet wall of said second chamber constituting the perforated inlet wall of the first chamber of said second pair.

6. The invention recited in claim 5, said second pair of chambers being longitudinally aligned with said first pair of chambers, the second chamber of said second pair having the imperforate end wall of the first chamber of the first pair in common therewith, said wall being in alignment with the common perforated end wall of the remaining two chambers to form a common wall having a perforated and an imperforate portion, and baffles above and below said common wall.

7. The invention recited in claim 4 including a perforated section in the said remaining side wall of the first chamber toward the perforated inlet wall thereof, said last perforated section comprising a second outlet for said first chamber.

8. The invention recited in claim 7, and a third chamber adjacent said first chamber and having said remaining wall thereof in common therewith, said second outlet of said first chamber constituting an inlet of said third chamber.

9. The invention recited in claim 3, and a second chamber adjacent the first chamber, the partially perforated wall of said first chamber being common to both chambers whereby the said outlet wall portion of the first chamber constitutes an inlet wall portion of said second chamber, said second chamber having a side wall opposite said inlet wall and two imperforate end walls, said second chamber extending downstream of gas flow beyond the side walls of said first chamber, and having a second perforated side wall portion further downstream than said perforate side wall portion which is common to said first and second chambers.

10. The invention recited in claim 9, and a third chamber downstream of said first chamber and having an end wall portion in common therewith and a side wall portion in such common relation with said second chamber that the said second perforated side wall portion of the second chamber constitutes a gas inlet for said third chamber.

References Cited in the file of this patent

UNITED STATES PATENTS

| Number | Name | Date |
|---|---|---|
| 1,357,886 | Meston | Nov. 2, 1920 |
| 1,400,795 | Bradley | Dec. 20, 1921 |

FOREIGN PATENTS

| Number | Country | Date |
|---|---|---|
| 486,828 | Germany | Nov. 26, 1929 |